(12) United States Patent
Nguyen

(10) Patent No.: US 8,068,721 B2
(45) Date of Patent: Nov. 29, 2011

(54) METHOD OF TRANSMITTING VIDEO DATA

(75) Inventor: Hang Nguyen, Clichy-la-Garenne (FR)

(73) Assignee: Alcatel Lucent, Paris (FR)

( * ) Notice: Subject to any disclaimer, the term of this patent is extended or adjusted under 35 U.S.C. 154(b) by 1602 days.

(21) Appl. No.: 11/412,844

(22) Filed: Apr. 28, 2006

(65) Prior Publication Data

US 2006/0256235 A1    Nov. 16, 2006

(30) Foreign Application Priority Data

May 11, 2005    (EP) ..................................... 05291017

(51) Int. Cl.
H04N 5/92    (2006.01)
(52) U.S. Cl. ........................ 386/326; 386/328; 386/329
(58) Field of Classification Search .................. 386/326
See application file for complete search history.

(56) References Cited

U.S. PATENT DOCUMENTS

| | | | |
|---|---|---|---|
| 6,611,513 B1 * | 8/2003 | ten Brink | ...................... 370/342 |
| 2002/0157058 A1 | 10/2002 | Ariel et al. | |

FOREIGN PATENT DOCUMENTS

WO    WO 2005/034414 A    4/2005

OTHER PUBLICATIONS

S. Wenger et al.: "Rip payload format for H.264 video" RFC3984, Feb. 2005, pp. 1-83, XP002348964.

Gharavi H et al.: "Cross-layer feedback control for video communications via mobile ad-hoc networks" Vehicular Technology Conference, 2003. VTC 2003-Fall. 2003 IEEE 58th Orlando, Flo, USA Oct. 6-9, 2003, Piscataway, NJ, USA, IEEE, US, Oct. 6, 2003, pp. 2941-2945, XP010702852.

Qi Qu et al.: "Robust H.264 video coding and transmission over bursty packet-loss wireless networks" Vehicular Technology Conference, 2003. vtc 2003-Fall. 2003 IEEE 58th Orlando, FL, USA, Oct. 6-9 2003, pp. 3395-3399, XP010701963.

(Continued)

Primary Examiner — Jamie Atala
(74) Attorney, Agent, or Firm — Fay Sharpe LLP

(57) ABSTRACT

The invention concerns a method of transmitting video data comprising information bits (201), a video processing unit (10, 20, 40) with a control unit (12, 22, 42) for sending and/or receiving such video data, and a computer program product for the execution of said method. The method comprises the application of a systematic channel encoding (202) on the information bits (201) of the video data and obtaining a sequence comprising the encoded information bits (203) and error correction bits (204, 403) of the information bits (201). For transmission to another video processing unit (10, 20, 40), the encoded information bits (203) and the error correction bits (204, 403) are inserted into a primary coded picture network abstraction layer (205, 401) and a redundant coded picture network abstraction layer (206, 402), respectively. At the other video processing unit (10, 20, 40), the error correction bits (204, 403) in the redundant coded picture network abstraction layer (206, 402) are used for detecting (404) and correcting (405) errors in the received primary coded picture network abstraction layer (205, 401) and for performing the video decoding (407) of the corrected primary coded picture network abstraction layer (406).

20 Claims, 4 Drawing Sheets

OTHER PUBLICATIONS

N. D.. Dao, W.A.C. Fernando: "Channel coding for H.264 video in constant bit rate transmission context over 3G mobile systems" Proceedings of the 2003 IEEE International Symposium on Circuits and Systems, vol. 2, 2003, pp. II-896-II-899, XP008053471.

S. Rane, A. Aaron, B. Girod: "Systematic lossy forward error protection for error-resilient digital video broadcasting" Proceeding of the SPIE, vol. 5308, no. 1, pp. 588-595, XP002348965.

Talluri R: "Error-Resilient Video Coding in the ISO MPEG-4 Standard" IEEE Communications Magazine, IEEE Service Center, Piscataway, N.J., US, vol. 36, no. 6, Jun. 1998, pp. 112-119, XP000668915.

Iain E G Richardson: "H.264/ MPEG-4 Part 10 White Paper—Context-Based Adaptive Arithmetic Coding (CABAC)." pp. 1-3, Oct. 17, 2003.

Iain E G Richardson: "H.264/ MPEG-4 Part 10 White Paper—Variable-Length Coding." pp. 1-7, Oct. 17, 2002.

Iain E G Richardson: "H.264/ MPEG-4 Part 10 White Paper—Overview of H.264." pp. 1-3, Oct. 7, 2002.

Wordiq.com : "Definition of Hamming Code—www.wordiq.com/definition/Hammingcode." pp. 1 of 4, Oct. 27, 2004.

Zarlink Semiconductor Inc. "Zarlink Semiconductor—www.zarlink.com." pp. 1-5, Oct. 1995.

* cited by examiner

METHOD OF TRANSMITTING VIDEO DATA

The invention is based on a priority application EP 05291017.1 which is hereby incorporated by reference.

FIELD OF THE INVENTION

The invention relates to a method of transmitting video data, a sending video processing device, a receiving video processing device, a network, and a computer program product for executing the method.

BACKGROUND OF THE INVENTION

Today, multimedia streaming transmission over wireless networks offers a mediocre user video quality. Indeed, wireless channels cause high bit error rates and the residual bit errors can still be significant in the received compressed video sequences. Errors are even more important in the received bitstreams to be decoded when the ARQ is limited or even impossible like, e.g., in real-time applications, or when the channel coding is not good enough compared with the channel state (ARQ=Automatic Repeat on Request).

However, today's source encoders, designed to compress data as much as possible, assume a reliable medium for transmission. Hence, source decoders are designed to deal with image or video files with no errors. In addition, there can be a propagation of the transmission errors which can adversely affect the received end-user quality. For example, entropy compression techniques, which are known to be very sensitive to errors, are used everywhere a compression is made such as in text compression (WinZip, zip, tar, gz, . . . ), image compression (JPEG, . . . ), audio compression, and video compression (MPEG, H2x, . . . ) (JPEG=Joint Picture Expert Group; MPEG=Moving Picture Expert Group).

When conventional source encoders based on an entropy compression technique are used, a single bit error can often create a loss of synchronisation of the sequence. What follows is an error propagation—spatially in the case of an image, or spatially and temporally in the case of a video—and the remaining part of the data is lost. The same phenomenon also happens to audio streaming transmission.

MPEG4-AVC, also known as H.264, is a new generation compression algorithm for consumer digital video and a very promising video coding standard (AVC=Advanced Video Coding). The MPEG4-AVC design covers a Video Coding Layer (=VCL), which efficiently represents the video content, and a Network Abstraction Layer (=NAL), which formats the VCL representation of the video and provides header information in a manner appropriate for conveyance by particular transport layers such as IP/RTP or for storage media (IP=Internet Protocol, RTP=Real-Time Transport Protocol).

The NAL comprises a succession of data packets with an integer number of bytes, so-called NAL units consisting of a one-byte header and payload data. The header indicates the type of the NAL unit, the (potential) presence of bit errors or syntax violations in the NAL unit payload, and information regarding the relative importance of the NAL unit for the decoding process. Some systems require delivery of the NAL units as an ordered stream of bytes or bits, in other systems, e.g., IP/RTP systems, the coded data is carried in packets framed by the system transport protocol.

The primary coded picture consists of NAL units that represent the samples of the picture. There is also a type of NAL called redundant coded picture containing a copy of some selected video macroblocks of the primary coded picture. Redundant coded pictures are used during loss or corruption of data in the primary coded picture. However, this approach to use redundant coded pictures to correct faulty primary coded pictures provides a very weak error correction, and the resulting data size—and hence the bandwidth cost—is significant.

SUMMARY OF THE INVENTION

It is the object of the present invention to improve the transmission of video data.

The object of the present invention is achieved by a method of transmitting video data from a first entity to a second entity, whereby the video data comprise information bits, the method comprising the steps of applying a systematic channel encoding on the information bits of the video data and obtaining a sequence comprising the encoded information bits and error correction bits of the information bits; generating a primary coded picture NAL comprising the encoded information bits of the video data; inserting the error correction bits into a redundant coded picture NAL; transferring the primary coded picture NAL and the redundant coded picture NAL from the first entity to the second entity; receiving the primary coded picture NAL and the redundant coded picture NAL at the second entity; using the error correction bits in the redundant coded picture NAL for detecting and correcting errors in the received primary coded picture NAL; and performing the video decoding of the corrected primary coded picture NAL. The object of the present invention is further achieved by a video processing device with a control unit, whereby the control unit is adapted for applying a systematic channel encoding on information bits of video data and obtaining a sequence comprising encoded information bits and error correction bits of the information bits; generating a primary coded picture NAL comprising the encoded information bits of the video data; inserting the error correction bits into a redundant coded picture NAL; transferring the primary coded picture NAL and the redundant coded picture NAL to another entity for using the error correction bits in the redundant coded picture NAL for detecting and for correcting errors in the received primary coded picture NAL, and for performing the video decoding of the corrected primary coded picture NAL at the other entity. Moreover, the object of the present invention is achieved by a video processing device with a control unit, whereby the control unit is adapted for receiving a primary coded picture NAL comprising encoded information bits of video data and a redundant coded picture NAL comprising error correction bits of the information bits from another entity, the encoded information bits and error correction bits obtained by applying a systematic channel encoding on the information bits of video data; using the error correction bits in the redundant coded picture NAL for detecting and correcting errors in the received primary coded picture NAL; and performing the video decoding of the corrected primary coded picture NAL. And the object of the present invention is achieved by a computer program product for transmission of video data, whereby the video data comprise information bits, the computer program product, when executed by a video processing unit, performing the steps of applying a systematic channel encoding on the information bits of the video data and obtaining a sequence comprising the encoded information bits and error correction bits of the information bits; generating a primary coded picture NAL comprising the encoded information bits of the video data; inserting the error correction bits into a redundant coded picture NAL; transferring the primary coded picture NAL and the redundant coded picture NAL to another video processing unit; receiving the primary coded picture NAL and the redundant coded picture NAL from the other video processing unit; using the error correction bits in the redundant coded picture NAL for detecting and correcting errors in the received primary coded picture NAL; and performing the video decoding of the corrected primary coded picture NAL.

The invention provides a more efficient solution than the existing solution in terms of error correction power and bandwidth. For a similar error correction power, the gain in bandwidth is of a factor of two to four. That means that the solution according to the invention needs two times to four times less bandwidth, or there can be two times to four times more users.

Instead of including a simple copy of the encoded data in the redundant coded picture NAL, the basic idea of the invention is to include more ingenious error correction data with higher error correction power and with smaller size. Hence, the invention allows to achieve a gain in bandwidth, the number of users and/or the number of radio resources.

The method according to the invention can be implemented with or independently from the standards.

Further advantages are achieved by the embodiments of the invention indicated by the dependent claims.

The method according to the invention can be applied to any video data with NAL structure. Preferably, the video data conform with the MPEG4-AVC and/or the H.264 standard.

When a code is transmitted over a channel in the presence of noise, errors will occur. The task of channel coding is to represent the source information in a manner that minimises the error probability in decoding. If it is necessary to transmit the information right at the first time, redundant check-bits are added to ensure error detection and error correction.

According to a preferred embodiment of the invention, the applied systematic channel encoding is based on a parity check code such as the Hamming code or the LDPC code (LDPC=Low-Density Parity Check). According to another preferred embodiment of the invention, the applied systematic channel encoding is based on a convolutional code.

The transmission medium for the transmission of the encoded video data from the first entity to the second entity may be any transmission medium suitable for the transmission of bit data, preferably under the IP/RTP protocol. According to a preferred embodiment of the invention, the transmission medium is a wireless network, in particular a mobile telecommunication network, or an IP network, in particular the Internet.

BRIEF DESCRIPTION OF THE DRAWINGS

These as well as further features and advantages of the invention will be better appreciated by reading the following detailed description of presently preferred exemplary embodiments taken in conjunction with accompanying drawings of which.

DESCRIPTION OF THE INVENTION

Figure 1:
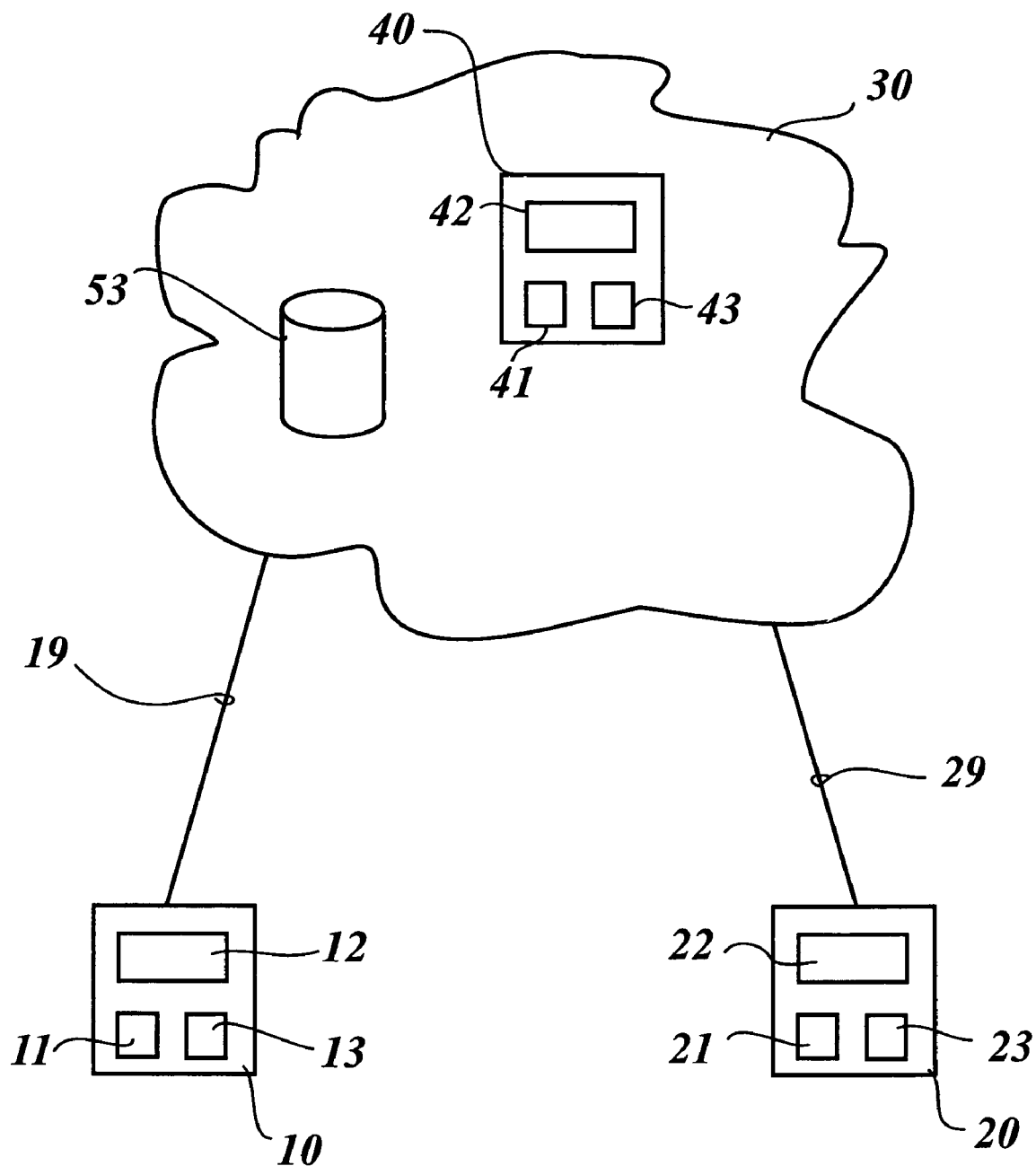
FIG. 1 is a block diagram of a system according to a first embodiment of the invention.

FIG. 1 shows a first entity 10 for sending video data, a second entity 20 for receiving video data, and a transmission medium 30 for the transmission of video data. For example, it is possible that the transmission medium 30 is a packet-switched network, preferably an IP based network, i.e., a communication network having a common layer three IP layer, such as the Internet. The first entity 10 and the second entity 20 may be computers with modems to send and receive video data to/from the packet-switched network. The computers 10, 20 may be equipped with software suited to process video data.

In another embodiment, it is also possible that the transmission medium 30 is a telecommunication system comprising circuit-switched telephony networks and packet-switched telephony networks, and that the first entity 10 and the second entity 20 are mobile telecommunication terminals, e.g., cellular phones, capable to send/receive and replay video data. The circuit-switched networks may be, e.g., PSTN, ISDN, GSM, or UMTS networks (PSTN=Public Switched Telephone Network; ISDN=Integrated Services Digital Network; GSM=Global System for Mobile Communication; UMTS=Universal Mobile Telecommunication Services).

The sending and receiving entities 10, 20 are video processing devices, and usually have capabilities to both send and receive video data. For example, in a specific case as shown in the exemplary embodiment of FIG. 1, the entity 10 may be the sending entity and the entity 20 may be the receiving entity. In another communication event, the roles may be changed and the entity 20 may be the sending entity and the entity 10 may be the receiving entity.

In the specific embodiment of FIG. 1, the sending entity 10 is a terminal comprising a transmitter 11, a control unit 12, and a memory 13, whereas the receiving entity 20 is a terminal comprising a receiver 21, a control unit 22, and a memory 23. The sending and receiving entities 10, 20 are connected via connections 19, 29 to the transmission medium 30. The connections 19, 29 may be a wire-line connection or a wireless connection.

The sending entity 10 may be triggered, manually by a user or automatically by a process trigger signal, to start the transfer of video data having a NAL structure from the sending entity 10 via the connection 19, the transmission medium 30, and the connection 29 to the receiving entity 20. The video data may be retrieved from the memory 13 of the sending entity 10, be processed in the control unit 12, and transferred to the transmission medium 30 by the transmitter 11. The receiving medium 20 may receive the video data from the transmission medium 30 by means of the receiver 21, process them in the control unit 22, and possibly store them in the memory 23. But it is also possible that the received video data are directly sent to a replay unit of the receiving entity 20 for rendering and displaying the video data on a display.

In another embodiment of FIG. 1, the video data are stored on a video processing unit 40, e.g. a video server or a video proxy, comprised within or accessible from the transmission medium 30, preferably a packet-switched network such as the Internet. The video processing unit 40 may comprise a control unit 42, a memory unit or storage medium 43, and a transceiver unit 41 for transmitting and receiving messages over the network 30.

The receiving entity 20 may send via the network 30 a video request to the transceiver unit 41 of the video processing unit 40. The video processing unit 40 may process the video request, retrieve the requested video data from the storage medium 43 or from an independent storage medium 53 of the network 30, process the video data and initiate the transmission of the video data to the receiving entity 20.

The terminals 10, 20 and the video processing unit 40 comprise an electronic circuit, possibly with a radio part for wireless telecommunication, at least one microprocessor, and application programs executed by the at least one microprocessor. The terminals 10, 20 further may comprise input and output means, for example a keypad, a microphone, a loudspeaker, and a display. The functionalities of the terminals 10, 20 and the video processing unit 40 are performed by the interaction of the hardware and software components. The memory units 13, 23, 43 of the terminals 10, 20 and of the video processing unit 40 may be adapted to receive and store a computer program product, whereby the execution of the computer program product by the terminals 10, 20 and of the video processing unit 40 is suited to provide the terminals 10, 20 and of the video processing unit 40 with additional functionalities.

The video processing unit 40 of the network 30 may be implemented as one or more servers with a peer-to-peer and/or hierarchical architecture. Also, the functionalities of the video processing provided by the terminals 10, 20 and the video processing device 40, possibly in connection with the storage medium 53, may be realised as separate, independent units or in a decentral structure where the functionalities are provided by a plurality of interdependent decentralised units.

Figure 2:
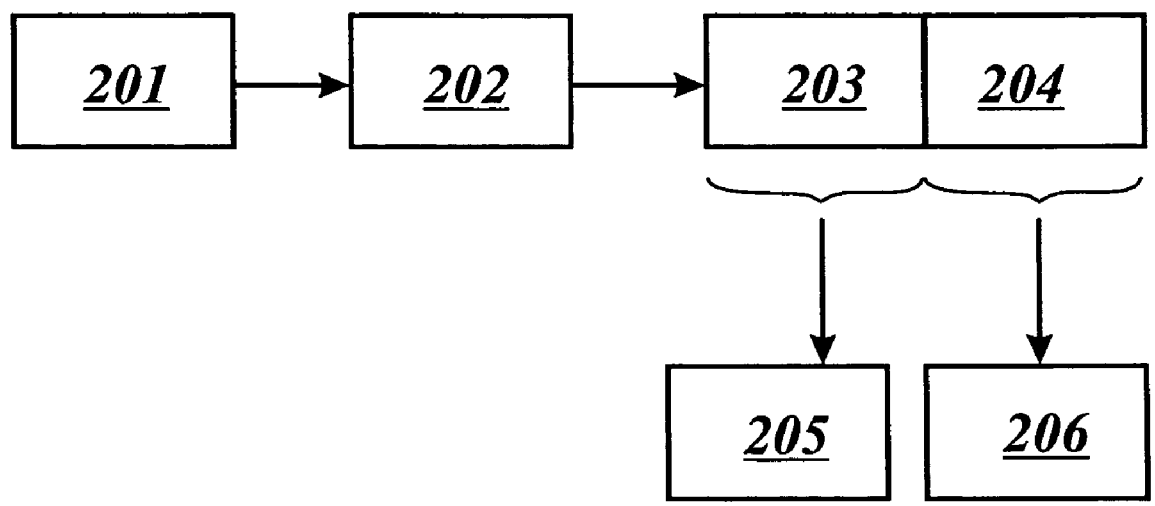
FIG. 2 is an operational step diagram showing the processes at a first device according to a first embodiment of the invention.

FIG. 2 shows the processing of the video data that is executed in the sending entity 10 or the video storing and processing unit 31 before transmission of the video data over the transmission medium 30.

The video data may be present as information bits 201. These information bits 201 may have been retrieved by the process of converting a video signal to a digital bitstream by means of an analog-to-digital conversion (A/D conversion). A/D conversion occurs in two steps, the sampling of data from the video stream, and the quantizing of each captured sample into a digital format.

Once the video data are digitised, they can be submitted to a systematic channel encoding 202 with error correction bits. The systematic channel encoding 202 can be based, e.g., on a Hamming code, a LDPC code, or a convolutional code. The result of the systematic channel encoding 202 is a sequence comprising the encoded information bits 203 and some more bits called error correction bits 204.

The information bits 203 are put into the "primary coded picture" NAL 205. The error correction bits 204 from the systematic channel coding 202 are put into the "redundant coded picture" NAL 206. The NAL units 205, 206 are included in IP/RTP packets for transmission. Then both "primary coded picture" NAL 205 and "redundant coded picture" NAL 206 are transmitted within the framework of an access unit from the sending entity 10 over the transmission medium 30 to the receiving entity 20.

Figure 3:
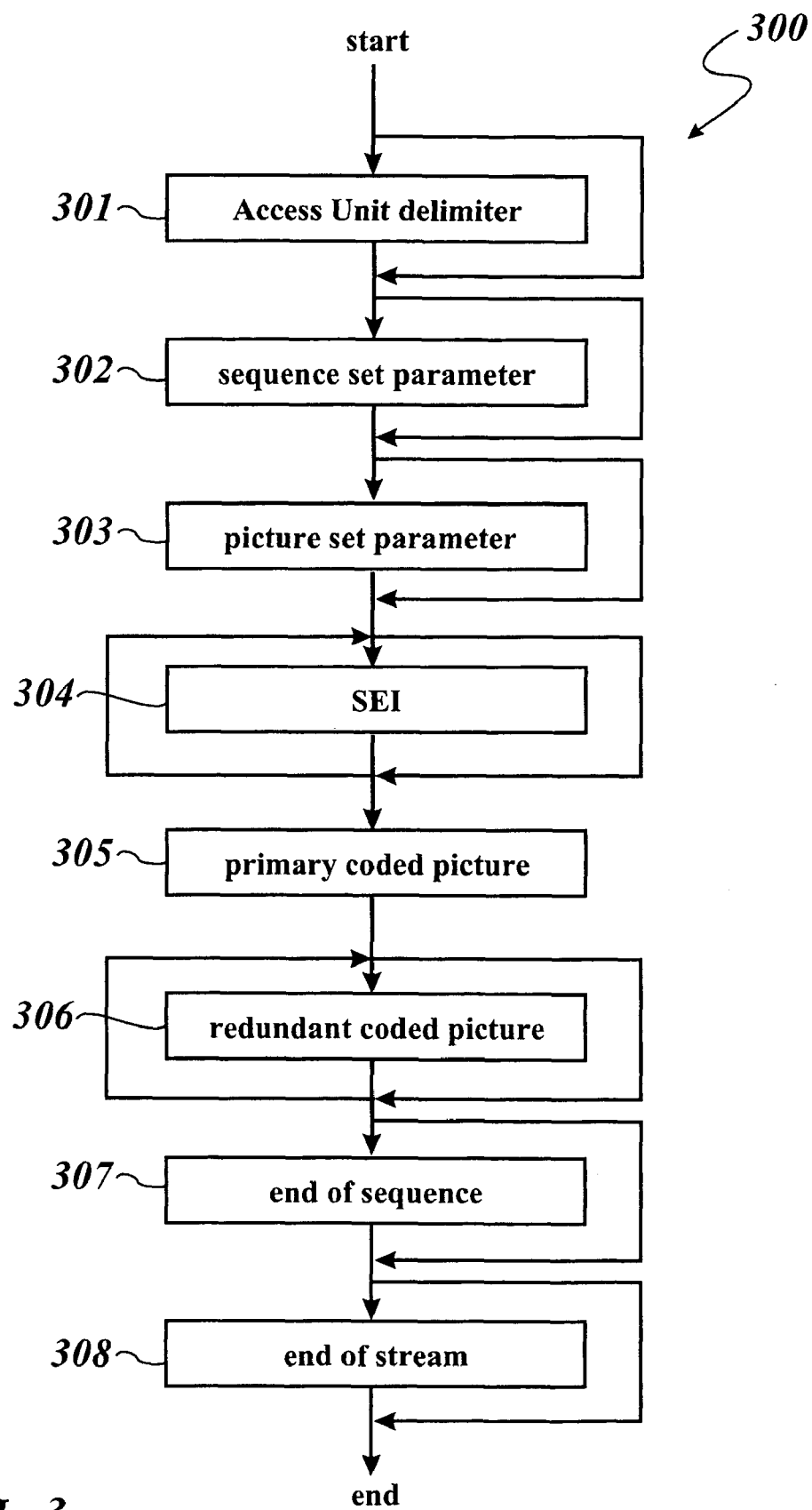
FIG. 3 is a flow chart concerning the structure of an access unit according to a first embodiment of the invention.

FIG. 3 is a flow chart describing the generation of the primary coded picture and the redundant coded picture within the framework of an access unit 300.

An access unit 300 represents a set of VCL NAL units that together compose a primary coded picture. In addition to the primary coded picture, an access unit 300 may also contain one or more redundant coded pictures or other NAL units not containing slices or slice data partitions of a coded picture. The decoding of an access unit 300 always results in a decoded picture.

In step 301, an access unit delimiter 301 may be inserted which may be used for the detection of the boundary between access units 300, and may therefore aid in the detection of the start of a new primary coded picture. In step 302, a sequence parameter set containing all information related to sequence of pictures, and in step 303, a picture parameter set containing all information related to all the slices belonging to a single picture may be put into the access unit 300.

It might be advantageous for gateways and receivers to receive the characteristics of layers and sub-sequences as well as dependency information of sub-sequences such as picture timing information. Therefore, one or more blocks of Supplemental Enhancement Information (=SEI) may be inserted in step 304.

In step 305, the primary coded picture is put in the access unit 300, containing the information bits obtained by the systematic channel encoding. The primary coded picture consists of a set of VCL NAL units consisting of slices or slice data partitions that represent the samples of the video picture. The primary coded picture contains all macroblocks of the picture.

As a following block of the access unit 300, in step 306 a redundant coded picture with the error correction bits from the systematic channel coding may be inserted into the access unit 300. Usually, a redundant coded picture is a coded representation of a picture or a part of a picture. The content of a redundant coded picture shall not be used by the decoding process for a bitstream conforming to H.264. The content of a redundant coded picture may be used by the decoding process for a bitstream that contains errors or losses. According to the invention, error correction bits are inserted into the redundant coded picture.

If the coded picture is the last picture of a coded video sequence, an end of sequence NAL unit may be present in step 307 to indicate the end of the sequence. Finally, if the coded picture is the last coded picture in the entire NAL unit stream, an end of stream NAL unit 308 may be present to indicate that the stream is ending.

Figure 4:
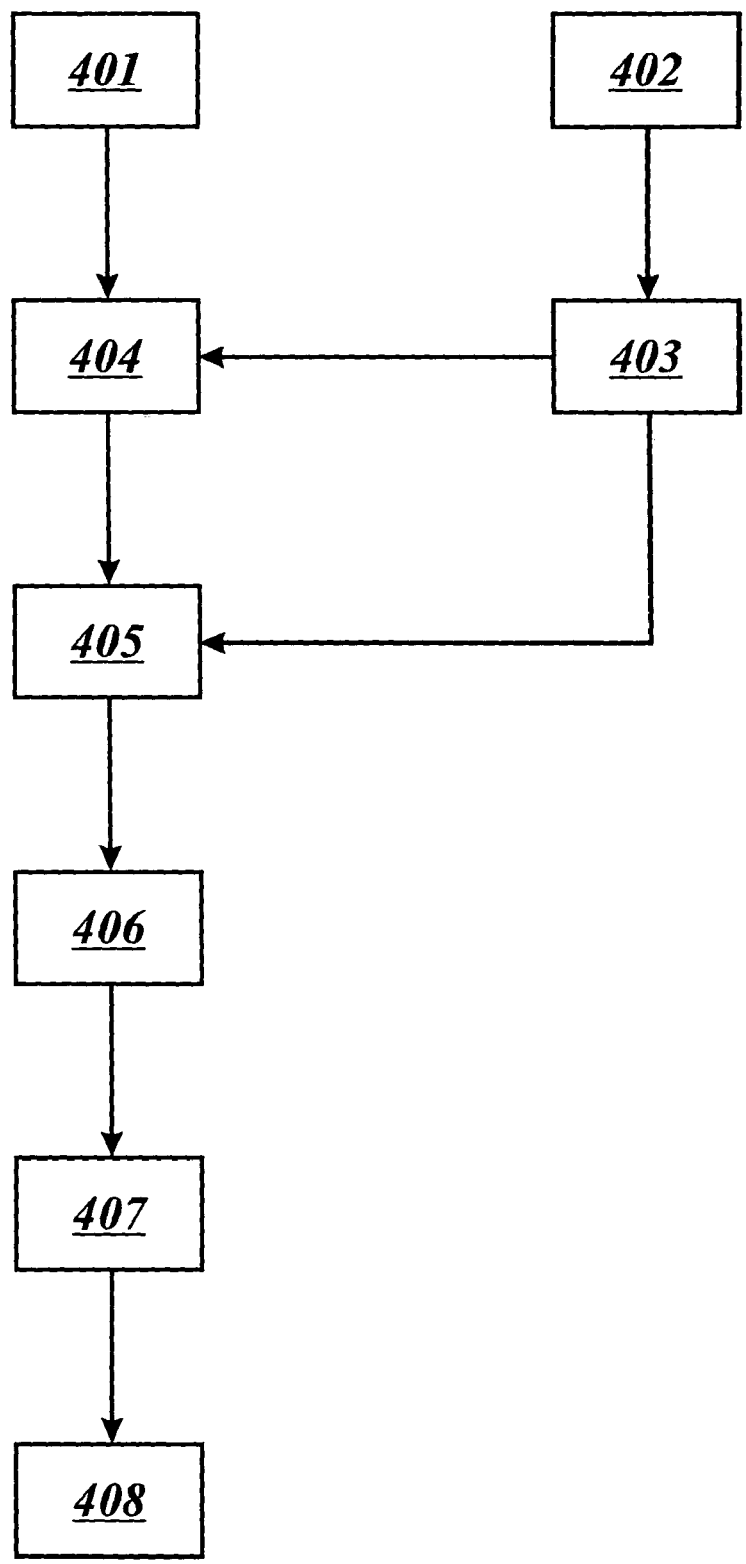
FIG. 4 is an operational step diagram showing the processes at a second device according to a first embodiment of the invention.

FIG. 4 shows the processing of the video data that is executed by the receiving entity 20 after transmission of the video data over the transmission medium 30.

The "primary coded picture" NAL 401 and the "redundant coded picture" NAL 402 are received by the receiving entity 20 as access units with a structure according to FIG. 3. When compared to the "primary coded picture" NAL 205 and the "redundant coded picture" NAL 206 at the first entity 10, the "primary coded picture" NAL 401 and the "redundant coded picture" NAL 402 at the second entity 20 may comprise one or more different information bits. The reason for these differences, i.e., the bit errors due to transmission, may be a poor transmission quality of the transmission medium 30. This may be particularly true for wireless transmission channels such as for mobile applications. Poor quality transmission channels may cause information bits to flip from one binary state to the other, i.e., from zero to one, or vice versa.

The error correction bits 403 are extracted from the redundant coded picture NAL 402. After that, when examining the primary coded picture NAL 401 for errors, the error correction bits 403 are used in a detection step 404 to detect if and where any errors are present in the primary coded picture NAL 401. In correction step 405, any such detected errors in the primary coded picture NAL 401 are corrected by means of the error correction bits 403. The result of the examination, detection and correction of the primary coded picture NAL 401 is the corrected primary coded picture NAL 406.

In a decoding process 407, the corrected primary coded picture NAL 406 is submitted to a video decoding, resulting in the corrected information bits 408. The corrected information bits 408 carry the video data which now can be processed at the receiving entity 20 or another device for display, transfer or storage.

The invention claimed is:

1. A method of transmitting video data from a first entity to a second entity, whereby the video data comprise information bits, wherein the method comprises the steps of:

applying a systematic channel encoding on information bits of video data and obtaining a sequence comprising encoded information bits and error correction bits of the information bits;

generating a primary coded picture network abstraction layer comprising the encoded information bits of the video data;

inserting the error correction bits into a redundant coded picture network abstraction layer by including error correction data with higher error correction power and with smaller size in the redundant coded picture network abstraction layer, rather than inserting a copy of select encoded information bits from the primary coded picture network abstraction layer;

transferring the primary coded picture network abstraction layer and the redundant coded picture network abstraction layer from the first entity to the second entity;

receiving the primary coded picture network abstraction layer and the redundant coded picture network abstraction layer at the second entity;

using the error correction bits in the redundant coded picture network abstraction layer for detecting and correcting errors in the received primary coded picture network abstraction layer to form a corrected primary coded picture network abstraction layer; and performing video decoding of the corrected primary coded picture network abstraction layer to form corrected information bits corresponding to the information bits of the video data.

2. The method of claim 1, comprises the steps of:
generating a primary coded picture network abstraction layer comprising the encoded information bits of the video data, whereby the primary coded picture network abstraction layer conforms with MPEG4-AVC and/or H.264 standards;

inserting the error correction bits into a redundant coded picture network abstraction layer, whereby the redundant coded picture network abstraction layer conforms with the MPEG4-AVC and/or the H.264 standards.

3. The method of claim 1, comprises the steps of:
applying a systematic channel encoding based on a Hamming code.

4. The method of claim 1, comprises the steps of:
applying a systematic channel encoding based on a LDPC code.

5. The method of claim 1, comprises the steps of:
applying a systematic channel encoding based on a convolutional code.

6. The method of claim 1, comprises the steps of:
transferring the primary coded picture network abstraction layer and the redundant coded picture network abstraction layer from the first entity to the second entity over an IP network, in particular the Internet.

7. A video processing device with
a control unit, wherein the control unit is adapted for
applying a systematic channel encoding on information bits of video data and obtaining a sequence comprising encoded information bits and error correction bits of the information bits;

generating a primary coded picture network abstraction layer comprising the encoded information bits of the video data;

inserting the error correction bits into a redundant coded picture network abstraction layer by including error correction data with higher error correction power and with smaller size in the redundant coded picture network abstraction layer, rather than inserting a copy of select encoded information bits from the primary coded picture network abstraction layer;

transferring the primary coded picture network abstraction layer and the redundant coded picture network abstraction layer to another entity for using the error correction bits in the redundant coded picture network abstraction layer for detecting and correcting errors in the received primary coded picture network abstraction layer to form a corrected primary coded picture network abstraction layer, and for performing video decoding of the corrected primary coded picture network abstraction layer to form corrected information bits corresponding to the information bits of video data.

8. A video processing device with
a control unit, wherein the control unit is adapted for
receiving a primary coded picture network abstraction layer comprising encoded information bits of video data and a redundant coded picture network abstraction layer comprising error correction bits of the information bits from another entity, the error correction bits inserted in the redundant coded picture network abstraction layer by including error correction data with higher error correction power and with smaller size in the redundant coded picture network abstraction layer, rather than inserting a copy of select encoded information bits from the primary coded picture network abstraction layer, the encoded information bits and error correction bits obtained by applying a systematic channel encoding on information bits of the video data;

using the error correction bits in the redundant coded picture network abstraction layer for detecting and correcting errors in the received primary coded picture network abstraction layer to form a corrected primary coded picture network abstraction layer; and performing video decoding of the corrected primary coded picture network abstraction layer to form corrected information bits corresponding to the information bits of video data.

9. A video processing device with a control unit according to claim 7, wherein the video processing device is a terminal, a video proxy, or a video gateway.

10. A computer program product for transmission of video data, whereby the video data comprise information bits, wherein the computer program product is recorded on a computer-readable medium and, when executed by a sending video processing unit, performs the steps of:

applying a systematic channel encoding on information bits of video data and obtaining a sequence comprising encoded information bits and error correction bits of the information bits;

generating a primary coded picture network abstraction layer comprising the encoded information bits of the video data;

inserting the error correction bits into a redundant coded picture network abstraction layer by including error correction data with higher error correction power and with smaller size in the redundant coded picture network abstraction layer, rather than inserting a copy of select encoded information bits from the primary coded picture network abstraction layer; and transferring the primary coded picture network abstraction layer and the redundant coded picture network abstraction layer to a receiving video processing unit.

11. The method set forth in claim 1, further comprising:
transferring the primary coded picture network abstraction layer and the redundant coded picture network abstraction layer from the first entity to the second entity over a wireless network, in particular a mobile telecommunication network.

12. The video processing device set forth in claim 7 wherein the control unit is also adapted for:
generating a primary coded picture network abstraction layer comprising the encoded information bits of the video data, whereby the primary coded picture network abstraction layer conforms with MPEG4-AVC and/or H.264 standards;
inserting the error correction bits into a redundant coded picture network abstraction layer, whereby the redundant coded picture network abstraction layer conforms with the MPEG4-AVC and/or the H.264 standards.

13. The video processing device set forth in claim 7 wherein the control unit is also adapted for:
applying a systematic channel encoding based on a Hamming code.

14. The video processing device set forth in claim 7 wherein the control unit is also adapted for:
applying a systematic channel encoding based on a LDPC code.

15. The video processing device set forth in claim 7 wherein the control unit is also adapted for:
applying a systematic channel encoding based on a convolutional code.

16. The video processing device set forth in claim 7 wherein the control unit is also adapted for:
transferring the primary coded picture network abstraction layer and the redundant coded picture network abstraction layer to the other entity over an IP network, in particular the Internet.

17. The video processing device set forth in claim 7 wherein the control unit is also adapted for:
transferring the primary coded picture network abstraction layer and the redundant coded picture network abstraction layer to the other entity over a wireless network, in particular a mobile telecommunication network.

18. The video processing device set forth in claim 8 wherein the primary coded picture network abstraction layer and the redundant coded picture network abstraction layer conform with MPEG4-AVC and/or H.264 standards.

19. The video processing device set forth in claim 8 wherein the control unit is also adapted for:
receiving the primary coded picture network abstraction layer and the redundant coded picture network abstraction layer over an IP network, in particular the Internet.

20. The computer program product set forth in claim 10 wherein the computer program product, when executed by the receiving video processing unit, performs the steps of:
receiving the primary coded picture network abstraction layer and the redundant coded picture network abstraction layer from the sending video processing unit;
using the error correction bits in the redundant coded picture network abstraction layer for detecting and correcting errors in the received primary coded picture network abstraction layer to form a corrected primary coded picture network abstraction layer; and
performing video decoding of the corrected primary coded picture network abstraction layer to form corrected information bits corresponding to the information bits of the video data.

* * * * *